Feb. 1, 1955  C. A. CRAWFORD  2,701,296
ELECTRICALLY-HEATED APPLIANCE
Original Filed Aug. 18, 1947  2 Sheets—Sheet 1
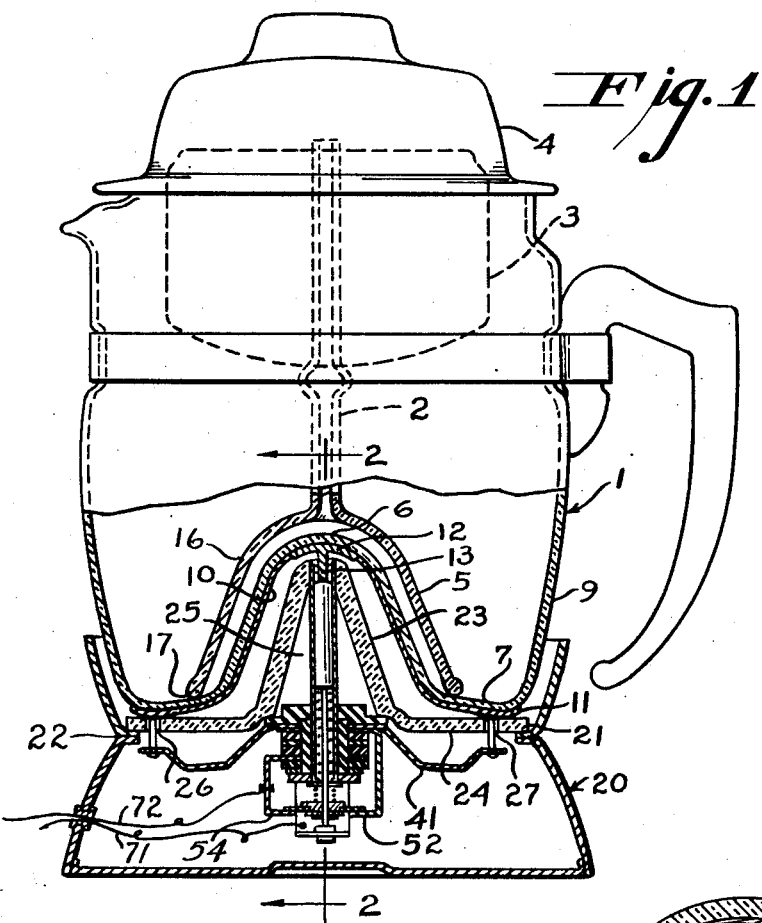
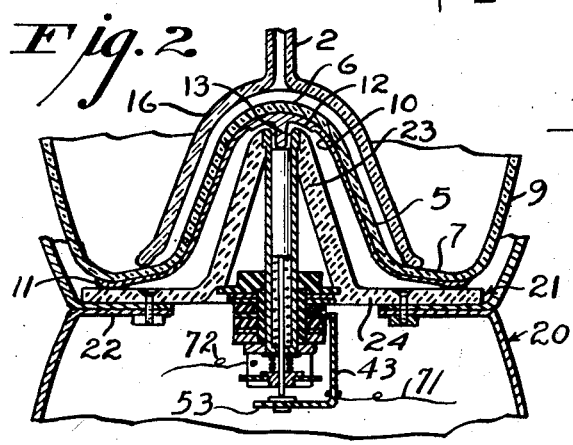
INVENTOR.
CLARK A. CRAWFORD
BY Rolf E. Schneider
ATTORNEY.

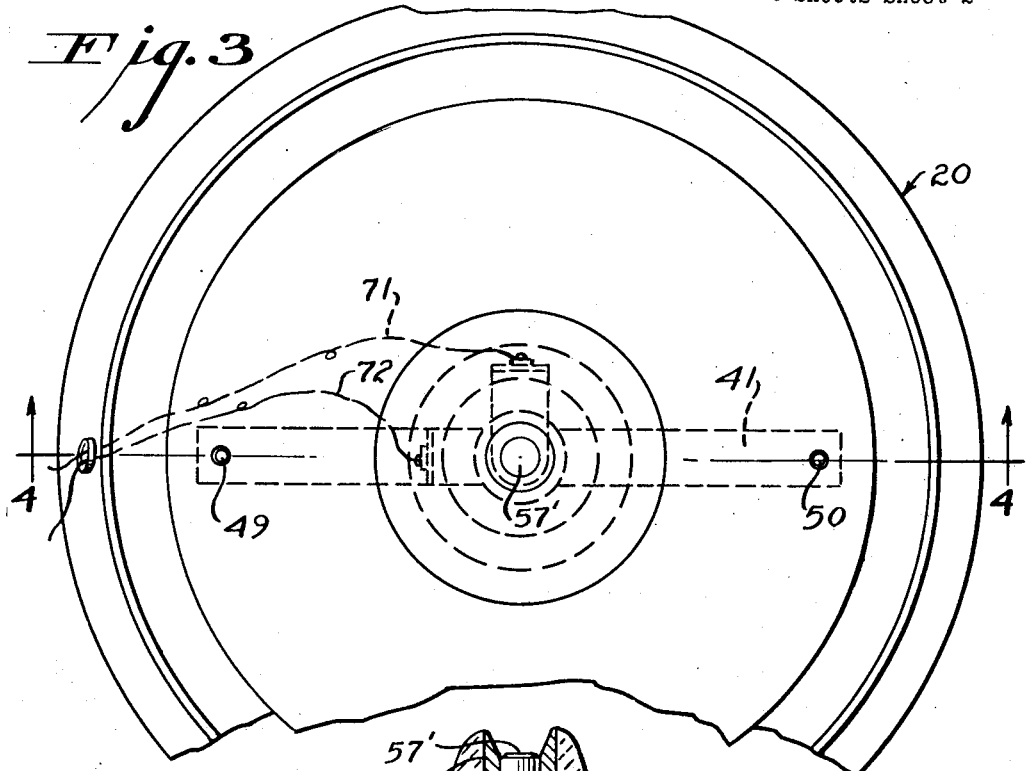
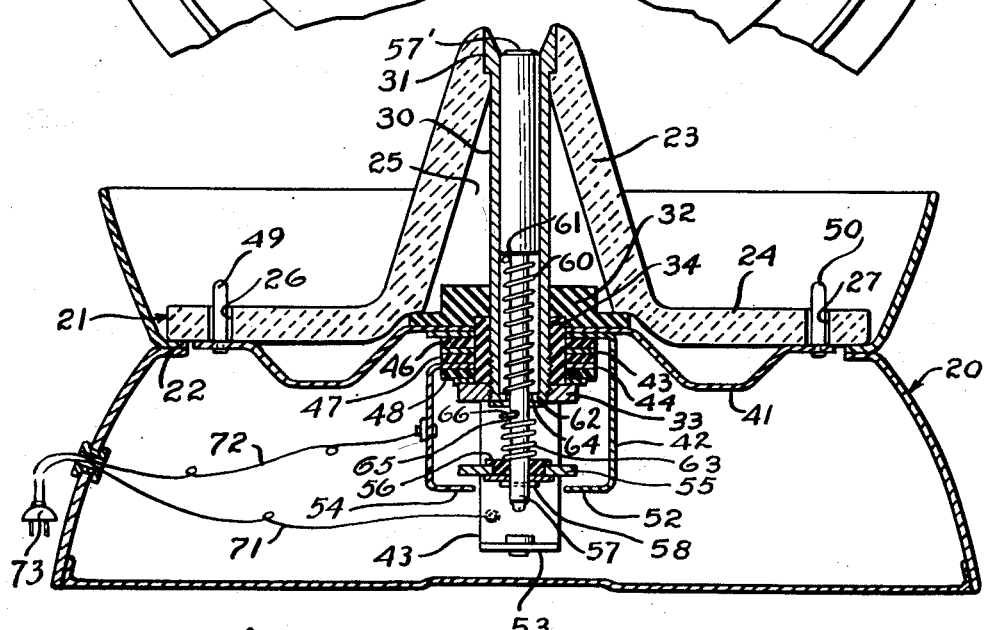

United States Patent Office 2,701,296
Patented Feb. 1, 1955

2,701,296

ELECTRICALLY HEATED APPLIANCE

Clark A. Crawford, Painted Post, N. Y., assignor to Corning Glass Works, Corning, N. Y., a corporation of New York Original application August 18, 1947, Serial No. 769,102, now Patent No. 2,609,478, dated September 2, 1952. Divided and this application August 1, 1952, Serial No. 302,123

8 Claims. (Cl. 219—43)

The present invention relates to an electrically heated appliance having its heating element integral therewith and designed for use with an associated, circuit-controlling support therefor. This application is a division of application Serial No. 769,102 filed August 18, 1947 by Anthony Miller and myself, now Patent No. 2,609,478 issued September 2, 1952.

In general, the prime object of the invention is a device of the foregoing character which will efficiently perform the purposes for which it is intended, which is simple and economical of construction, and which can be expeditiously, conveniently, and safely manipulated.

Another object is a cordless electrical cooking utensil which can be washed without danger of detrimental effect to the heating element.

A still further object is an electric percolator capable of brewing coffee at an extremely rapid rate.

Further objects and features of the invention will become apparent from a further perusal of this specification when considered in connection with the accompanying drawings forming a part thereof.

In the accompanying drawings:

Fig. 1 is a side elevation, partly in section, illustrating a coffee percolator embodying the invention and a support therefor.

Fig. 2 is a fragmentary view of Fig. 1 taken on line 2—2.

Fig. 2a is an enlarged view, in section, of a fragment of the percolator.

Fig. 3 is a top plan view of the greater part of the base of the assembly.

Fig. 4 is a sectional elevation taken on line 4—4 of Fig. 3.

In brief, the invention as illustrated comprises a glass percolator having a vessel 1, pump 2, basket 3, and cover 4, adapted for use with a support or stand 20. The vessel differs from conventional forms in that it has a raised, conical-shaped bottom, the wall 5 having a dome-shaped top 6. The base of the conical bottom wall portion 5 is joined to a surrounding substantially horizontally disposed bottom portion 7 whose periphery is in turn joined to the surrounding side wall 9.

The underside of portions 5—7 is provided with an electrically conductive coating 10 integrally attached to the glass. In order to prevent the watt density or heat input per unit of area from increasing excessively as the center of the area is approached, the conductive coating is so distributed that its electrical resistance per unit of area increases as the distance from center increases. This is accomplished by properly grading the coating thickness. Putting it another way, the coating is so distributed that its thickness, and hence its conductivity, increases as the distance from the periphery of the coated area increases.

The peripheral portion of coating 10 is provided with a terminal 11 comprising a low-resistance metallized coating in the form of a flat circular band. Centrally disposed on the coating 10 is a similar low-resistance coating 11′ to which is attached, by soldering for example, a terminal 12 having a depending prod or post 13.

A suitable abrasion-resistant electrically conductive coating may be produced by spraying the vessel, while heated, with tin chloride or other tin salt. The low-resistance terminals may be formed by applying a silver metallizing composition and firing it on the glass in known manner.

The pump 2 has a support portion 16 of the general configuration of the vessel parts 5 and 6, and is of such size that when resting on the vessel bottom there is approximately one-eighth inch space between the opposing surfaces of the vessel and pump support portions. The bottom edge portion 17 of the pump is not provided with serrations, the perfectly plain usual manufacturing irregularities in portion 17 and the adjoining bottom surface of portion 7 of the vessel providing ample space for the passage of fluid from the vessel 1 into the space between support portion 16 and vessel portions 5 and 6.

The vessel support 20 contains an element 21 of electrical insulation, carried on a circular base portion 22, and comprising a central upstanding or conical portion 23 and a surrounding flat portion 24. Portion 23 has an aperture or passage 25 (Fig. 4) therethrough, and portion 24 has apertures or passages 26 and 27 therethrough. A sleeve 30 passing through aperture 25 is securely clamped between the enlarged end 31 of sleeve 30 and a clamping washer 32. Arranged on sleeve 30 between washer 32 and a clamping nut 33 is an insulating sleeve 34 about which are arranged a series of flat springs 41—44. Springs 41 and 42 directly engage one another, whereas springs 42—44 are insulated from one another by suitable spacer washers 46—48. Spring 41 at its opposite end carries electrodes 49 and 50 which project up through apertures 26 and 27 respectively. Springs 42 and 44 are bent to bring their free ends 52 and 54 in position to be electrically connected to one another by a metal washer 55 supported on an insulator 56 carried on a plunger electrode 57, and spring 43 is bent to bring its free end 53 directly under electrode 57.

The plunger electrode 57 within the sleeve 30 is surrounded by a spring 60 compressed between an enlarged portion 61 of the electrode and an inturned flange 62 of the sleeve, and accordingly spring 60 tends to move electrode 57 up. This movement is restricted by a stop washer 64 prevented from moving down on the electrode by the end 65 of a spring 63 which passes through an aperture 66 in electrode 57. Spring 63 is threaded on electrode 57 and is held in a compressed state between flange 62 and insulator 56 by a pin 58 passing through the electrode, and serves to enable downward movement of the plunger into contact with spring end 53 after washer 55 engages the relatively rigid contact spring ends 52 and 54.

Incoming conductors 71 and 72 are at one end connected to springs 43 and 44, and at their other end terminate in a conventional attachment plug 73 for connection with any available current source.

As will be clear from an inspection of Fig. 4, when the support 20 is unoccupied, no electrical connection exists between springs 44 and 42, or between spring 43 and electrode 57, and accordingly exposure of electrodes 49, 50 and the shielded end 57′ of electrode 57 presents no shock hazard. Furthermore, because of the shielded position of the top or exposed end 57′ of electrode 57, danger of inadvertent depression thereof far enough to connect a potential to the electrodes 49, 50 and 57 is prevented. When, however, the vessel is placed on the support 20, prod 13 engages and lowers electrode 57 into engagement with spring end 53 and hence into electrical connection with conductor 71. As electrode 57 is being lowered, the metal washer 55 bridges spring ends 52 and 54 to electrically connect conductor 72 with spring 42 and accordingly with spring 41, and electrodes 49 and 50.

The springs 41 and 60 are so tensioned that a compressive force equal to the weight of the vessel, pump, basket and cover, plus fluid to a level at least to the top of the dome, is required to compress them to their operative positions as shown in Figs. 1 and 2, so that if the liquid boils away below this level, the vessel will be automatically raised and electrical connection to its heating element interrupted.

Although the invention has been shown applied to a coffee maker of a particular type, it will be appreciated that various features thereof may be incorporated in other forms of electrically-heated devices without departing from the spirit and scope of the invention as claimed.

The combination of an electrically heated device of the above type and the above support therefor is claimed in the above-indicated application of Anthony Miller and myself, together with the support per se.

What is claimed is:

1. In a coffee maker, a vessel having a bottom which comprises a central portion of generally conical configuration, surrounded by a relatively flat band area connecting the central portion of the bottom with the vessel sidewall, an electric heating element in the form of a thin film of conductive material spread over and wholly blanketing that exterior surface of the vessel which is of conical configuration, and a pump within the vessel including a base of conical configuration supported on that bottom area of the vessel between the conical bottom portion and the vessel side wall and having its underside spaced an average distance of between one-eighth and one-fourth inch from the oppositely disposed conical bottom surface of the vessel.

2. In combination, a glass container, an electrically-conductive coating covering a circular bottom area of said container, and low resistance terminals for connection with an electrical current source joined to said coating, one of said terminals covering the central area of said coating and one of said terminals being in the form of an endless band and joined to the peripheral portion of said coating.

3. A combination such as defined by claim 2 wherein the coated portion is of generally conical configuration and is surrounded by an annular flange portion joined at its periphery to the container side wall.

4. In combination, a container having a bottom comprising a central portion of generally conical configuration surrounded by an annular flange portion joined at its periphery to the container wall, a coating of electrically-conductive material covering and bonded to that surface of the conical portion outside the container and constituting an electric heating element therefor, and terminals for said element bonded to the central area of the coating and to the bordering portion thereof respectively.

5. In an electric coffee maker, a vessel having an upwardly extending generally hollow cone-shaped bottom with the apex of dome configuration, a conductive coating spread over the surface of the vessel bottom constituting the inner surface of the cone, a low electrical resistance terminal bonded to said conductive coating in the central area thereof, and a second low electrical resistance terminal bonded to said coating along its bordering area.

6. A glass coffee-maker bowl having a bottom with an upwardly extending generally cone-shaped portion whose base is joined to a substantially horizontally disposed surrounding portion, a conductive coating bonded to the underside surface of the cone and extending over the major portion of the surface area of the surrounding portion, and low-resistance terminals bonded to said coating, one of said terminals being located on the uppermost under-surface area of the cone and one being in the form of a circular band connected to the peripheral portion of said coating.

7. The combination such as defined by claim 2, wherein the thickness of the coating is so distributed that its resistance per unit of surface area increases as the distance from the central area increases.

8. The combination such as defined by claim 4, wherein the electrically conductive material is distributed more thickly as the distance from the bordering portion thereof increases.

References Cited in the file of this patent

UNITED STATES PATENTS

| | | |
|---|---|---|
| 799,377 | Harden | Sept. 12, 1905 |
| 2,020,364 | Lehmann | Nov. 12, 1935 |
| 2,021,661 | Kisfaludy | Nov. 19, 1935 |
| 2,054,714 | Reich | Sept. 15, 1936 |
| 2,081,894 | Meyer et al. | May 25, 1937 |
| 2,119,680 | Long | June 7, 1938 |
| 2,266,090 | Smith | Dec. 16, 1941 |
| 2,378,772 | Hummel | June 19, 1945 |
| 2,429,420 | McMaster | Oct. 21, 1947 |
| 2,431,998 | Ely | Dec. 2, 1947 |
| 2,434,560 | Gunter | Jan. 13, 1948 |
| 2,475,379 | Strong | July 5, 1949 |
| 2,609,478 | Crawford et al. | Sept. 2, 1952 |

FOREIGN PATENTS

| | | |
|---|---|---|
| 921,934 | France | Jan. 20, 1947 |